(12) United States Patent
Nam et al.

(10) Patent No.: US 8,761,087 B2
(45) Date of Patent: Jun. 24, 2014

(54) METHOD AND SYSTEM FOR BALANCING REFERENCE SIGNAL POWERS ACROSS OFDM SYMBOLS

(75) Inventors: Young-Han Nam, Richardson, TX (US); Yingyang Li, Beijing (CN); Jianzhong Zhang, Irving, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 632 days.

(21) Appl. No.: 12/941,848

(22) Filed: Nov. 8, 2010

(65) Prior Publication Data

US 2011/0110219 A1    May 12, 2011

Related U.S. Application Data

(60) Provisional application No. 61/260,307, filed on Nov. 11, 2009, provisional application No. 61/323,240, filed on Apr. 12, 2010.

(51) Int. Cl.
*H04W 4/00*    (2009.01)

(52) U.S. Cl.
USPC .......................... 370/328; 370/209; 455/422.1

(58) Field of Classification Search
CPC ............................ H04W 72/042; H04W 72/04
See application file for complete search history.

(56) References Cited

U.S. PATENT DOCUMENTS

2011/0134860 A1*  6/2011  Dai et al. ...................... 370/329

OTHER PUBLICATIONS

"DL DM-RS Design for Rel-9 LTE", NTT Docomo, 3GPP TSG WG1 Meeting #57bis, Jun. 29-Jul. 3, 2009, 8 pages.
"DL DM-RS Design for Rel. 9 LTE", NTT Docomo, 3GPP TSG WG1 Meeting #58, Aug. 24-28, 2009, 9 pages.

* cited by examiner

*Primary Examiner* — Jianye Wu

(57) ABSTRACT

A base station includes a reference signal allocator that allocates a first layer of dedicated reference signals and a second layer of reference signals to the same resource elements in a first resource block. The reference signals are allocated to two adjacent resource elements corresponding to a first OFDM symbol and a second OFDM symbol on a first, second, and third subcarriers of the first resource block. The base station also includes a reference signal multiplexer that multiplexes the first layer with the second layer. A first cover code W1 is applied to the first layer. A second cover code W2, different from the first cover code, is applied to the second layer in a first and third subcarriers, and a variation of the second cover code W2' is applied to the second layer in a second subcarrier.

24 Claims, 19 Drawing Sheets

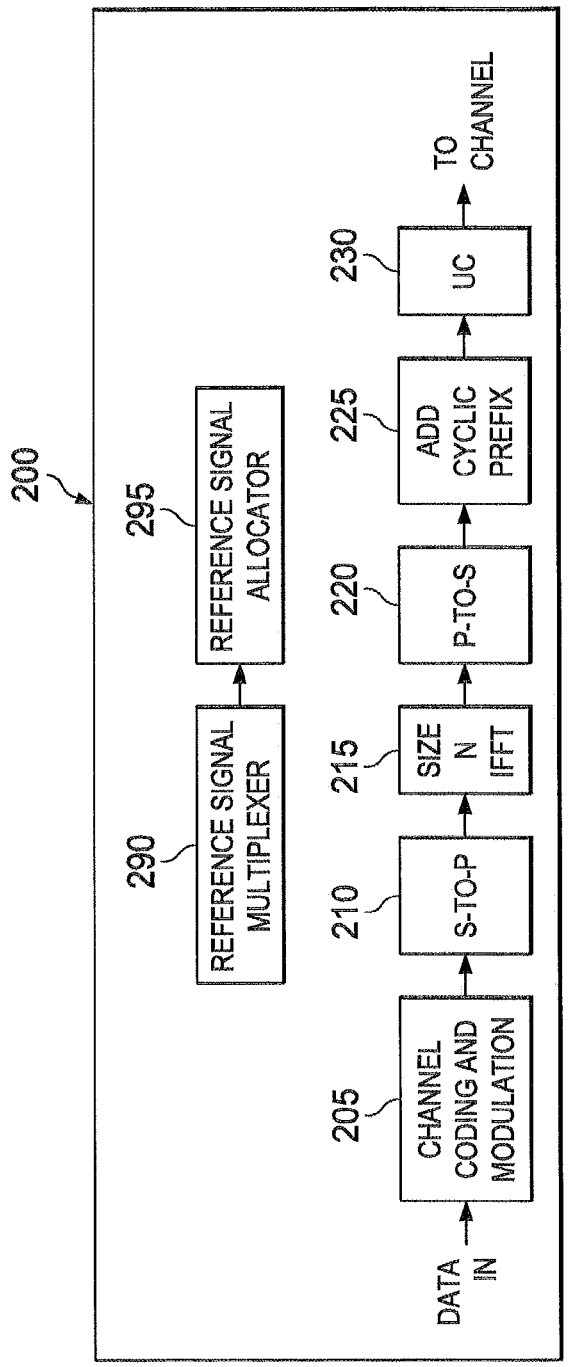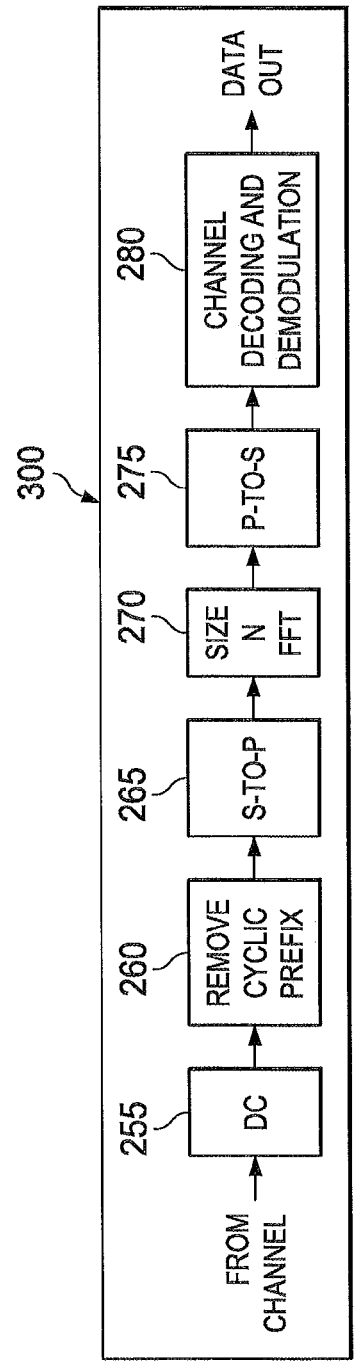

1100

| $f_{in}$ | LAYER 0 | LAYER 1 |
|---|---|---|
| SUBCARRIER 0 | 1 | 1 |
| SUBCARRIER 5 | 1 | $\omega$ |
| SUBCARRIER 10 | 1 | $\omega^*$ |

| $f_{in}$ | LAYER 0 | LAYER 1 | LAYER 2 |
|---|---|---|---|
| SUBCARRIER 0 | 1 | 1 | 1 |
| SUBCARRIER 5 | 1 | $\omega$ | $\omega^*$ |
| SUBCARRIER 10 | 1 | $\omega^*$ | $\omega$ |

| $f_{in}$ | LAYER 0 | LAYER 1 | LAYER 2 | LAYER 3 |
|---|---|---|---|---|
| FIRST SUBCARRIER WITH DM RS | 1 | 1 | 1 | 1 |
| SECOND SUBCARRIER | 1 | -1 | $\omega$ | $\omega^*$ |
| THIRD SUBCARRIER | 1 | 1 | $\omega^*$ | $\omega$ |
| FOURTH SUBCARRIER | 1 | -1 | 1 | 1 |
| FIFTH SUBCARRIER | 1 | 1 | $\omega$ | $\omega^*$ |
| SIXTH SUBCARRIER | 1 | -1 | $\omega^*$ | $\omega$ |

| $f_{in}$ | LAYER 0 | LAYER 1 | LAYER 2 | LAYER 3 |
|---|---|---|---|---|
| FIRST SUBCARRIER WITH DM RS | 1 | 1 | 1 | 1 |
| SECOND SUBCARRIER | 1 | $\omega$ | $\omega^*$ | -1 |
| THIRD SUBCARRIER | 1 | $\omega^*$ | $\omega$ | 1 |
| FOURTH SUBCARRIER | 1 | 1 | 1 | -1 |
| FIFTH SUBCARRIER | 1 | $\omega$ | $\omega^*$ | 1 |
| SIXTH SUBCARRIER | 1 | $\omega^*$ | $\omega$ | -1 |

| $f_{in}$ | LAYER 0 | LAYER 1 | LAYER 2 | LAYER 3 |
|---|---|---|---|---|
| SUBCARRIER 0 | 1 | 1 | $\omega$ | $\omega$ |
| SUBCARRIER 5 | 1 | $\omega$ | $\omega$ | 1 |
| SUBCARRIER 10 | 1 | $\omega$ | 1 | $\omega$ |

| $f'_{in}$ | LAYER 0 | LAYER 1 |
|---|---|---|
| SUBCARRIER 0 | 1 | $\omega$ |
| SUBCARRIER 5 | 1 | $\omega^*$ |
| SUBCARRIER 10 | 1 | 1 |

1901 — RECEIVE A PLURALITY OF REFERENCE SIGNALS IN A FIRST RESOURCE BLOCK. A FIRST LAYER OF THE REFERENCE SIGNALS AND A SECOND LAYER OF THE REFERENCE SIGNALS ARE ALLOCATED TO THE SAME RESOURCE ELEMENTS IN THE FIRST RESOURCE BLOCK, WHEREIN THE REFERENCE SIGNALS ARE (i) ALLOCATED TO A FIRST GROUP OF TWO ADJACENT RESOURCE ELEMENTS CORRESPONDING TO A FIRST OFDM SYMBOL AND A SECOND OFDM SYMBOL ON A FIRST SUBCARRIER OF THE FIRST RESOURCE BLOCK, (ii) ALLOCATED TO A SECOND GROUP OF TWO ADJACENT RESOURCE ELEMENTS CORRESPONDING TO THE FIRST OFDM SYMBOL AND THE SECOND OFDM SYMBOL ON A SECOND SUBCARRIER OF THE FIRST RESOURCE BLOCK, AND (iii) ALLOCATED TO A THIRD GROUP OF TWO ADJACENT RESOURCE ELEMENTS CORRESPONDING TO THE FIRST OFDM SYMBOL AND THE SECOND OFDM SYMBOL ON A THIRD SUBCARRIER OF THE FIRST RESOURCE BLOCK. THE FIRST LAYER OF THE REFERENCE SIGNALS IS MULTIPLEXED WITH THE SECOND LAYER OF THE REFERENCE SIGNALS. A FIRST COVER CODE W1 IS APPLIED TO THE FIRST LAYER OF THE REFERENCE SIGNALS, A SECOND COVER CODE W2, DIFFERENT FROM THE FIRST COVER CODE, IS APPLIED TO THE SECOND LAYER OF THE REFERENCE SIGNALS ON THE FIRST SUBCARRIER AND THE THIRD SUBCARRIER, AND A VARIATION OF THE SECOND COVER CODE W2' IS APPLIED TO THE SECOND LAYER OF THE REFERENCE SIGNALS ON THE SECOND SUBCARRIER 1903 — RECEIVE A PLURALITY OF REFERENCE SIGNALS IN A SECOND RESOURCE BLOCK ADJACENT TO THE FIRST RESOURCE BLOCK IN THE FREQUENCY DOMAIN. THE FIRST LAYER OF THE REFERENCE SIGNALS AND THE SECOND LAYER OF THE REFERENCE SIGNALS ARE ALLOCATED TO THE SAME RESOURCE ELEMENTS IN THE SECOND RESOURCE BLOCK. THE REFERENCE SIGNALS ARE (i) ALLOCATED TO A FIRST GROUP OF TWO ADJACENT RESOURCE ELEMENTS CORRESPONDING TO THE FIRST OFDM SYMBOL AND THE SECOND OFDM SYMBOL ON A FIRST SUBCARRIER OF THE SECOND RESOURCE BLOCK, (ii) ALLOCATED TO A SECOND GROUP OF TWO ADJACENT RESOURCE ELEMENTS CORRESPONDING TO THE FIRST OFDM SYMBOL AND THE SECOND OFDM SYMBOL ON A SECOND SUBCARRIER OF THE SECOND RESOURCE BLOCK, AND (iii) ALLOCATED TO A THIRD GROUP OF TWO ADJACENT RESOURCE ELEMENTS CORRESPONDING TO THE FIRST OFDM SYMBOL AND THE SECOND OFDM SYMBOL ON A THIRD SUBCARRIER OF THE SECOND RESOURCE BLOCK. THE FIRST LAYER OF THE REFERENCE SIGNALS IS MULTIPLEXED WITH THE SECOND LAYER OF THE REFERENCE SIGNALS. THE FIRST COVER CODE W1 IS APPLIED TO THE FIRST LAYER OF THE REFERENCE SIGNALS, THE SECOND COVER CODE W2 IS APPLIED TO THE SECOND LAYER OF THE REFERENCE SIGNALS ON THE SECOND SUBCARRIER, AND THE VARIATION OF THE SECOND COVER CODE W2' IS APPLIED TO THE SECOND LAYER OF THE REFERENCE SIGNALS ON THE FIRST SUBCARRIER AND THE THIRD SUBCARRIER

METHOD AND SYSTEM FOR BALANCING REFERENCE SIGNAL POWERS ACROSS OFDM SYMBOLS

CROSS-REFERENCE TO RELATED APPLICATION(S) AND CLAIM OF PRIORITY

The present application claims priority to U.S. Provisional Patent Application No. 61/260,307, filed Nov. 11, 2009, entitled "MULTI-LAYER BEAMFORMING METHODS IN WIRELESS COMMUNICATION SYSTEMS" and U.S. Provisional Patent Application No. 61/323,240, filed Apr. 12, 2010, entitled "MULTI-LAYER BEAMFORMING METHODS IN WIRELESS COMMUNICATION SYSTEMS." The above-identified patent documents are hereby incorporated by reference.

TECHNICAL FIELD OF THE INVENTION

The present application relates generally to wireless communications and, more specifically, to a method and system for reference signal (RS) pattern design.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station includes a downlink transmit path comprising circuitry configured to transmit a plurality of reference signals in a first resource block. The resource block comprises S OFDM symbols, each of the S OFDM symbols comprises N subcarriers, and each subcarrier of each OFDM symbol comprises a resource element. The base station also includes reference signal allocator configured to allocate a first layer of the reference signals and a second layer of the reference signals to the same resource elements in the first resource block. The reference signals are (i) allocated to a first group of two adjacent resource elements corresponding to a first OFDM symbol and a second OFDM symbol on a first subcarrier of the first resource block, (ii) allocated to a second group of two adjacent resource elements corresponding to the first OFDM symbol and the second OFDM symbol on a second subcarrier of the first resource block, and (iii) allocated to a third group of two adjacent resource elements corresponding to the first OFDM symbol and the second OFDM symbol on a third subcarrier of the first resource block. The base station further includes a reference signal multiplexer configured to multiplex the first layer of the reference signals with the second layer of the reference signals by applying a first cover code W1 to the first layer of the reference signals, applying a second cover code W2, different from the first cover code, to the second layer of the reference signals on the first subcarrier and the third subcarrier, and applying a variation of the second cover code W2' to the second layer of the reference signals on the second subcarrier.

A method of operating a base station is provided. The method includes transmitting a plurality of reference signals in a first resource block. The resource block comprises S OFDM symbols, each of the S OFDM symbols comprises N subcarriers, and each subcarrier of each OFDM symbol comprises a resource element. The method also includes allocating a first layer of the reference signals and a second layer of the reference signals to the same resource elements in the first resource block. The reference signals are (i) allocated to a first group of two adjacent resource elements corresponding to a first OFDM symbol and a second OFDM symbol on a first subcarrier of the first resource block, (ii) allocated to a second group of two adjacent resource elements corresponding to the first OFDM symbol and the second OFDM symbol on a second subcarrier of the first resource block, and (iii) allocated to a third group of two adjacent resource elements corresponding to the first OFDM symbol and the second OFDM symbol on a third subcarrier of the first resource block. The method further includes multiplexing the first layer of the reference signals with the second layer of the reference signals by applying a first cover code W1 to the first layer of the reference signals, applying a second cover code W2, different from the first cover code, to the second layer of the reference signals on the first subcarrier and the third subcarrier, and applying a variation of the second cover code W2' to the second layer of the reference signals on the second subcarrier.

A subscriber station is provided. The subscriber station includes a downlink receive path that includes circuitry configured to receive a plurality of reference signals in a first resource block. The resource block comprising S OFDM symbols, each of the S OFDM symbols comprises N subcarriers, and each subcarrier of each OFDM symbol comprises a resource element. A first layer of the reference signals and a second layer of the reference signals are allocated to the same resource elements in the first resource block. The reference signals are (i) allocated to a first group of two adjacent resource elements corresponding to a first OFDM symbol and a second OFDM symbol on a first subcarrier of the first resource block, (ii) allocated to a second group of two adjacent resource elements corresponding to the first OFDM symbol and the second OFDM symbol on a second subcarrier of the first resource block, and (iii) allocated to a third group of two adjacent resource elements corresponding to the first OFDM symbol and the second OFDM symbol on a third subcarrier of the first resource block. The first layer of the reference signals is multiplexed with the second layer of the reference signals. A first cover code W1 is applied to the first layer of the reference signals, a second cover code W2, different from the first cover code, is applied to the second layer of the reference signals on the first subcarrier and the third subcarrier, and a variation of the second cover code W2' is applied to the second layer of the reference signals on the second subcarrier.

A method of operating a subscriber station is provided. The method includes receiving a plurality of reference signals in a first resource block. The resource block comprises S OFDM symbols, each of the S OFDM symbols comprises N subcarriers, and each subcarrier of each OFDM symbol comprises a resource element. A first layer of the reference signals and a second layer of the reference signals are allocated to the same resource elements in the first resource block. The reference signals are (i) allocated to a first group of two adjacent resource elements corresponding to a first OFDM symbol and a second OFDM symbol on a first subcarrier of the first resource block, (ii) allocated to a second group of two adjacent resource elements corresponding to the first OFDM symbol and the second OFDM symbol on a second subcarrier of the first resource block, and (iii) allocated to a third group of two adjacent resource elements corresponding to the first OFDM symbol and the second OFDM symbol on a third subcarrier of the first resource block. The first layer of the reference signals is multiplexed with the second layer of the reference signals. A first cover code W1 is applied to the first layer of the reference signals, a second cover code W2, different from the first cover code, is applied to the second layer of the reference signals on the first subcarrier and the third subcarrier, and a variation of the second cover code W2' is applied to the second layer of the reference signals on the second subcarrier.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a high-level diagram of an OFDMA transmitter according to one embodiment of the disclosure;

FIG. 3 is a high-level diagram of an OFDMA receiver according to one embodiment of the disclosure;

FIG. 11 is a table of scaling factors used for reference signal scaling for rank-2 transmission according to an embodiment of this disclosure;

FIG. 12 is a table of scaling factors used for reference signal scaling for rank-3 transmission according to an embodiment of this disclosure;

FIG. 13 is a table of scaling factors used for reference signal scaling for rank-2, 3 and 4 transmissions according to an embodiment of this disclosure;

FIG. 14 is a table of scaling factors used for reference signal scaling for rank-2, 3 and 4 transmissions according to another embodiment of this disclosure;

FIG. 15 is a table illustrating a construction of a resource block according to an embodiment of this disclosure;

FIG. 17 is a table of scaling factors used for reference signal scaling for rank-2 transmission according to another embodiment of this disclosure;

FIG. 19 illustrates a method of operating a subscriber station according to an embodiment of this disclosure.

DETAILED DESCRIPTION OF THE INVENTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
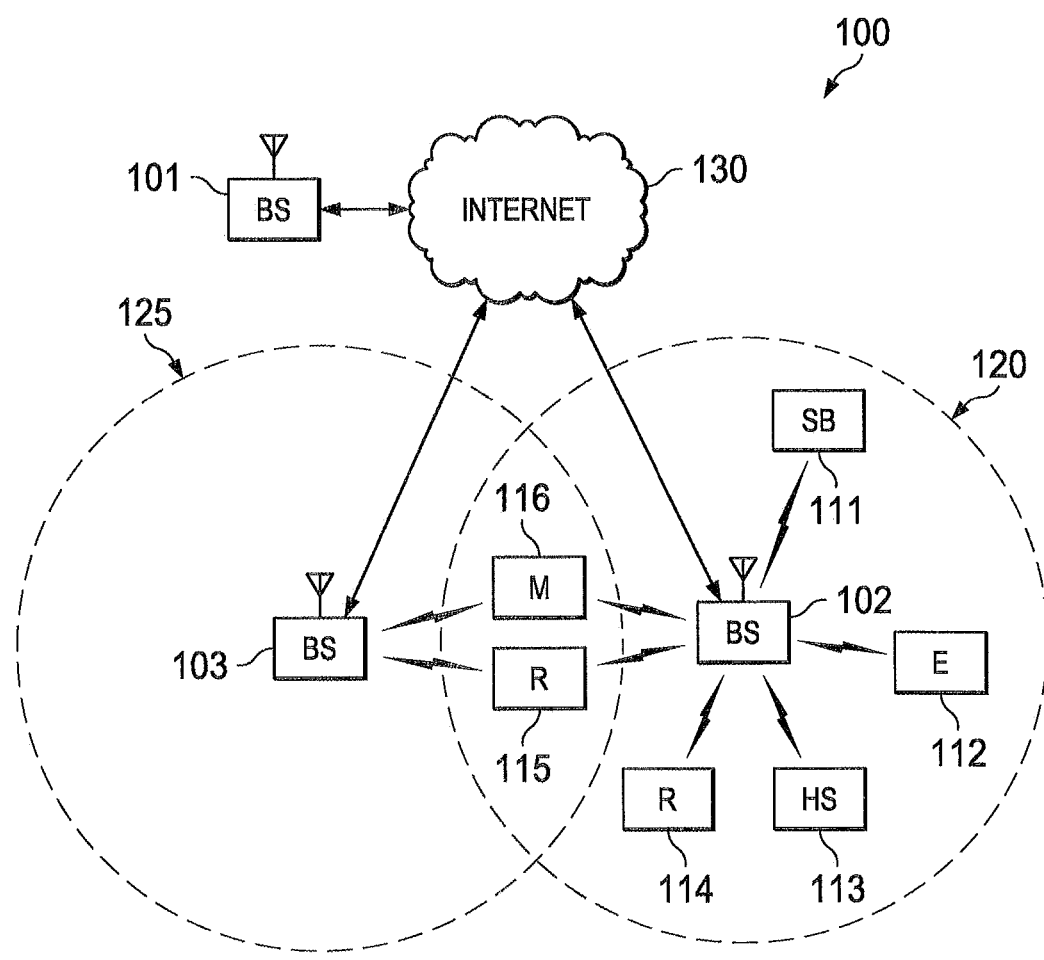
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{SC}^{RB}$ subcarriers and $M_{symb}^{DL}$ OFDM symbols. The quantity $N_{RB}^{DL}$ depends on the downlink transmission bandwidth configured in the cell and fulfills $N_{RB}^{min, DL} \leq N_{RB}^{DL} \leq N_{RB}^{max, DL}$, where $N_{RB}^{min, DL}$ and $N_{RB}^{max, DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL} N_{sc}^{RB}-1$ and $l=0, \ldots N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p. UE-specific reference signals (or dedicated RS: DRS) are supported for single-antenna-port transmission of Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 millisecond (msec) frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

For dual-layer beamforming, two sets of dedicated RSs (DRS, a.k.a, DM-RS) are defined for demodulation, where two sets of RSs are multiplexed in RBs in a subframe by code-division multiplexing (CDM). For example, a CDM RS pattern for dual-layer beamforming is introduced in 3GPP RAN1 contribution R1-090185 "Dual ports DRS design for BF," CATT, 3GPP TSG RAN WG1 meeting #55bis, January 2009, which is hereby incorporated by reference into the present application as if fully set forth herein.

Furthermore, a CDM/FDM-based pilot pattern that can support up to 4 layer transmissions is introduced in R1-090875, "Further Considerations and Link Simulations on Reference Signals in LTE-A," Qualcomm Europe, 3GPP TSG RAN WG1 meeting #56, February 2009, which is hereby incorporated by reference into the present application as if fully set forth herein.

Figure 4A:
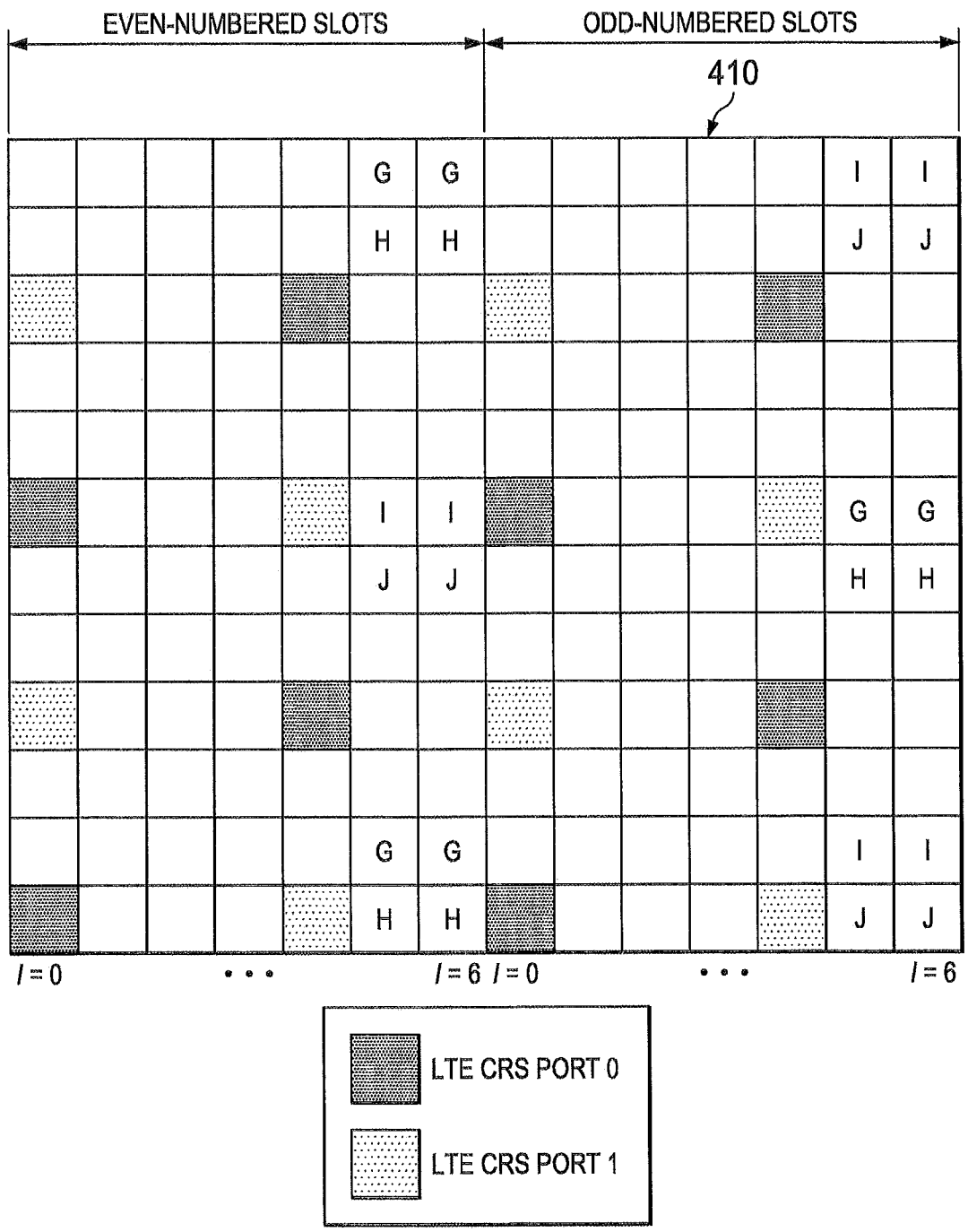
FIGS. 4A and 4B illustrate dedicated reference signal patterns according to an embodiment of the disclosure.
Figure 4B:
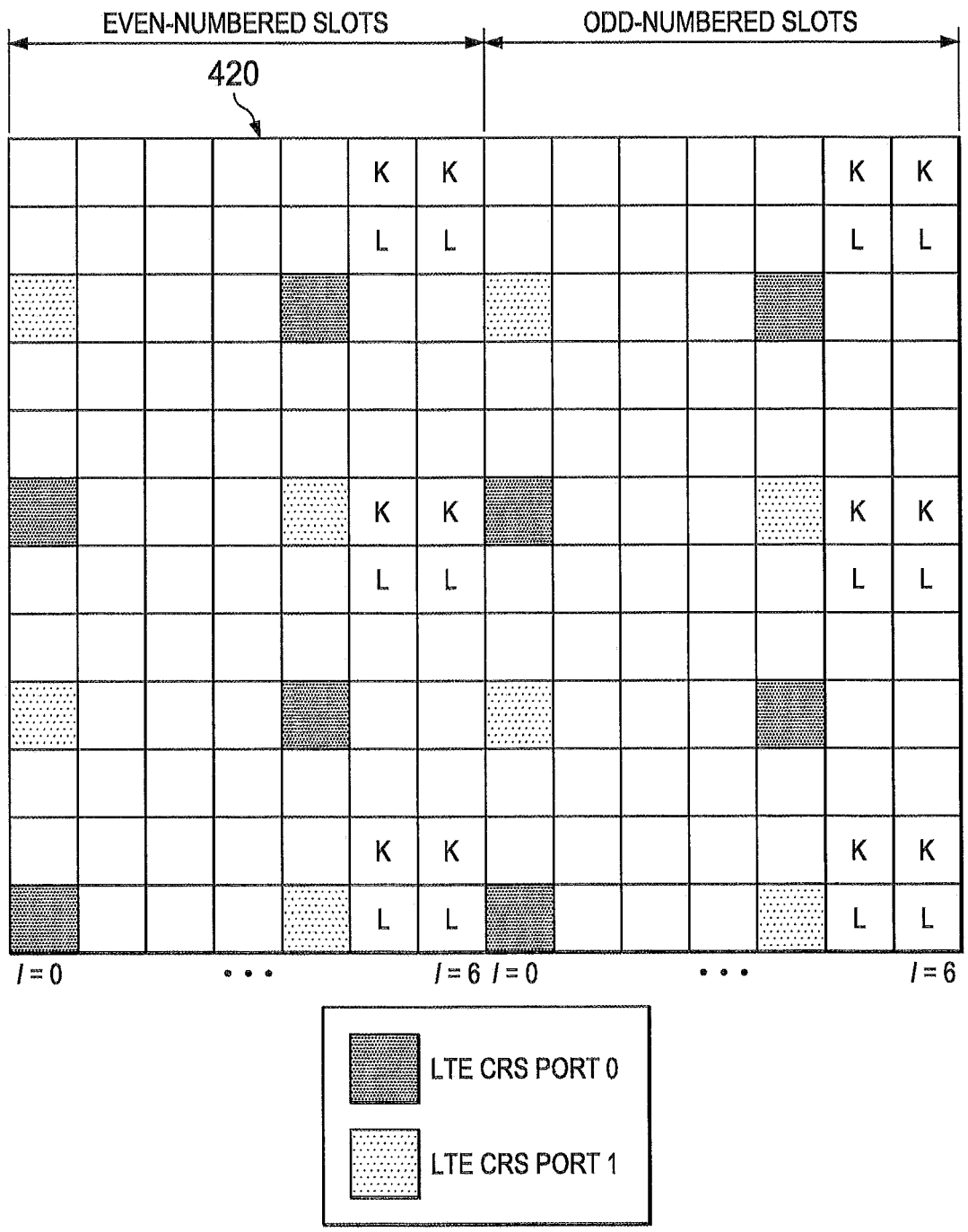

FIGS. 4A and 4B illustrate dedicated reference signal patterns 410 and 420 according to an embodiment of this disclosure.

As shown in FIGS. 4A and 4B, REs labeled with labeled with a letter X, where X is one of G, H, I, J, L, K, are used to carry a number of DRS among the 8 DRS, where the number of DRS are CDM'ed.

Pattern 410 is based on a spreading factor 2 CDM across two time-adjacent REs with the same alphabet label, while pattern 420 is based on a spreading factor 4 CDM across two groups of two time-adjacent REs with the same alphabet label. The 8 antenna ports in a rank-8 transmission pattern are referred to as antenna ports 4,5,6,7,8,9,10,11 to distinguish them from the antenna ports in rank-2 and rank-4 transmission patterns. It is noted that in Rel-8 LTE, antenna ports 0, 1, 2, 3, 4, 5 are used for CRS, MBSFN RS and Rel-8 DRS. Hence, if the numbering convention extending Rel-8 LTE is followed, the new antenna port numbers may start from 7. Therefore, rank-2 transmission pattern will have antenna ports 7,8. Rank-4 transmission pattern will have antenna ports 7,8,9,10, and rank-8 transmission pattern will have antenna ports 11, 12, 13, 14, 15, 16, 17, 18.

In one example embodiment of pattern 410, the REs labeled G carry DRS 4, 5. The REs labeled H carry DRS 6,7. The REs labeled I carry DRS 8,9. The REs labeled J carry DRS 10,11. On the other hand, in one example embodiment of pattern 420, the REs labeled K carry DRS 4,5,6,7 while the REs labeled L carry DRS 8,9,10,11.

Figure 5:
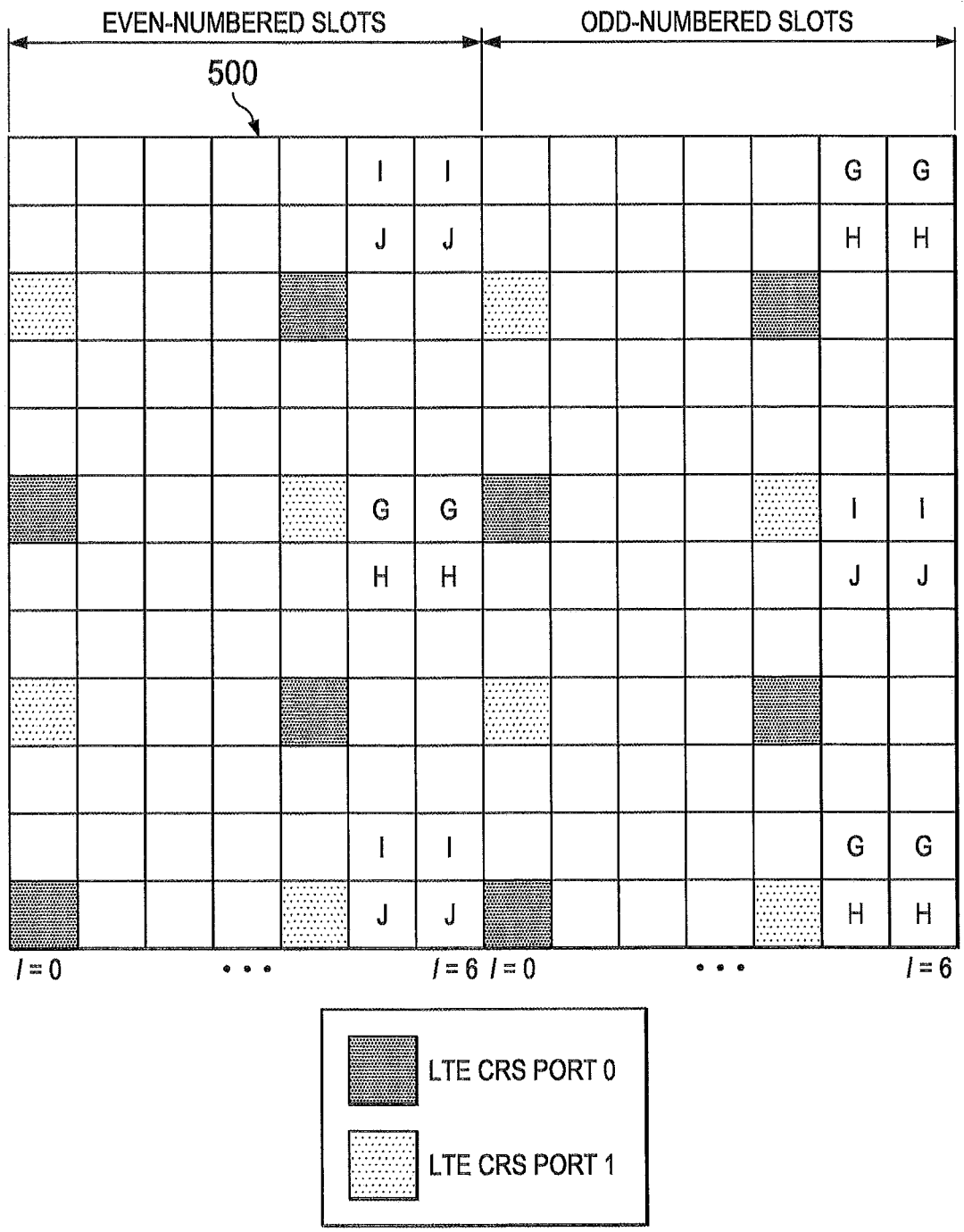
FIG. 5 illustrates a rotated dedicated reference signal pattern according to an embodiment of this disclosure.

FIG. 5 illustrates a rotated dedicated reference signal pattern 500 according to an embodiment of this disclosure.

Note that when multiple RBs using pattern 410 are allocated, an RB rotation may be used. For example, in one embodiment, even numbered RBs use pattern 410 as shown in FIGS. 4A and 4B, while odd numbered RBs use a rotated pattern 500 as shown in FIG. 5.

Figure 6:
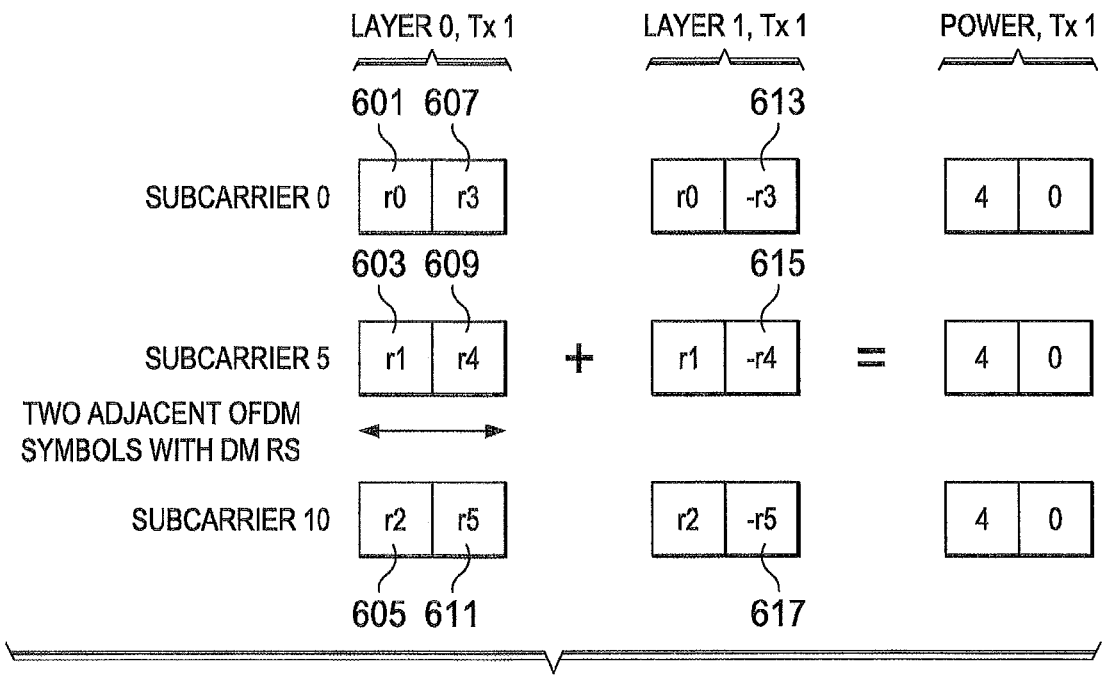
FIG. 6 illustrates power imbalance across OFDM symbols.

FIG. 6 illustrates power imbalance across OFDM symbols.

When the two DM RS have the same RS sequence, a power-imbalance across OFDM symbols occurs after CDM spreading. In FIG. 6, it is assumed that the precoding vectors for the two layers associated with the two DM RS are [1 1 1 1] and [1 1 −1 −1], where the entries of the two vectors are for Tx antenna 1, 2, 3 and 4 from the left to the right. In addition, it is assumed that the RS sequence is [r0 r1 r2 r3 r4 r5 . . . ] and the first 6 entries are mapped to the 6 REs of each layer shown in FIG. 6 in subcarriers first, OFDM symbols last order. Here, r0, . . . , r5 are complex numbers with magnitude 1. With regard to Tx antenna 1, in both layers, three REs 601, 603, 605 on a first OFDM symbol with DM RS have signals r0, r1, r2, respectively, from the top to the bottom in both layer 0 and layer 1. However, the REs 607, 609, 611 on a second, adjacent OFDM symbol have signals r3, r4, r5 in layer 0, while the REs 613, 615, 617 have signals −r3, −r4 and −r5 in layer 1. Hence, the sum power across the three subcarriers on the first OFDM symbol is 4, and the sum power on the second OFDM symbol is 0.

However, it is desirable to keep a consistent power radiation in OFDM symbols.

Accordingly, this disclosure provides a method and system for balancing out RS powers across OFDM symbols with DM RS, for various DM RS patterns.

In one embodiment of this disclosure, a DM RS corresponding to a first transmission layer (or a transmission stream) is considered. In one subcarrier with the DM RS, a Walsh cover $W=[w_0, w_1, \ldots w_N]$ is assigned. Then, in a closest subcarrier with the DM RS, a variation of the Walsh cover W, e.g. W', is assigned. Examples of the variation of the Walsh cover are:

W' is constructed by flipping the sign of W. In other words, W'=−W;

W' is constructed by cyclically shift the elements in W to the right. In other words, $W'=[w_N, w_0, w_1, \ldots, w_{N-1}]$; and W' is constructed by cyclically shift the elements in W to the left. In other words, $W=[w_1, \ldots, w_N, w_0]$.

In some embodiments, a second Walsh cover U is used across all the subcarriers for a second DM RS corresponding to a second transmission layer.

Figure 7:
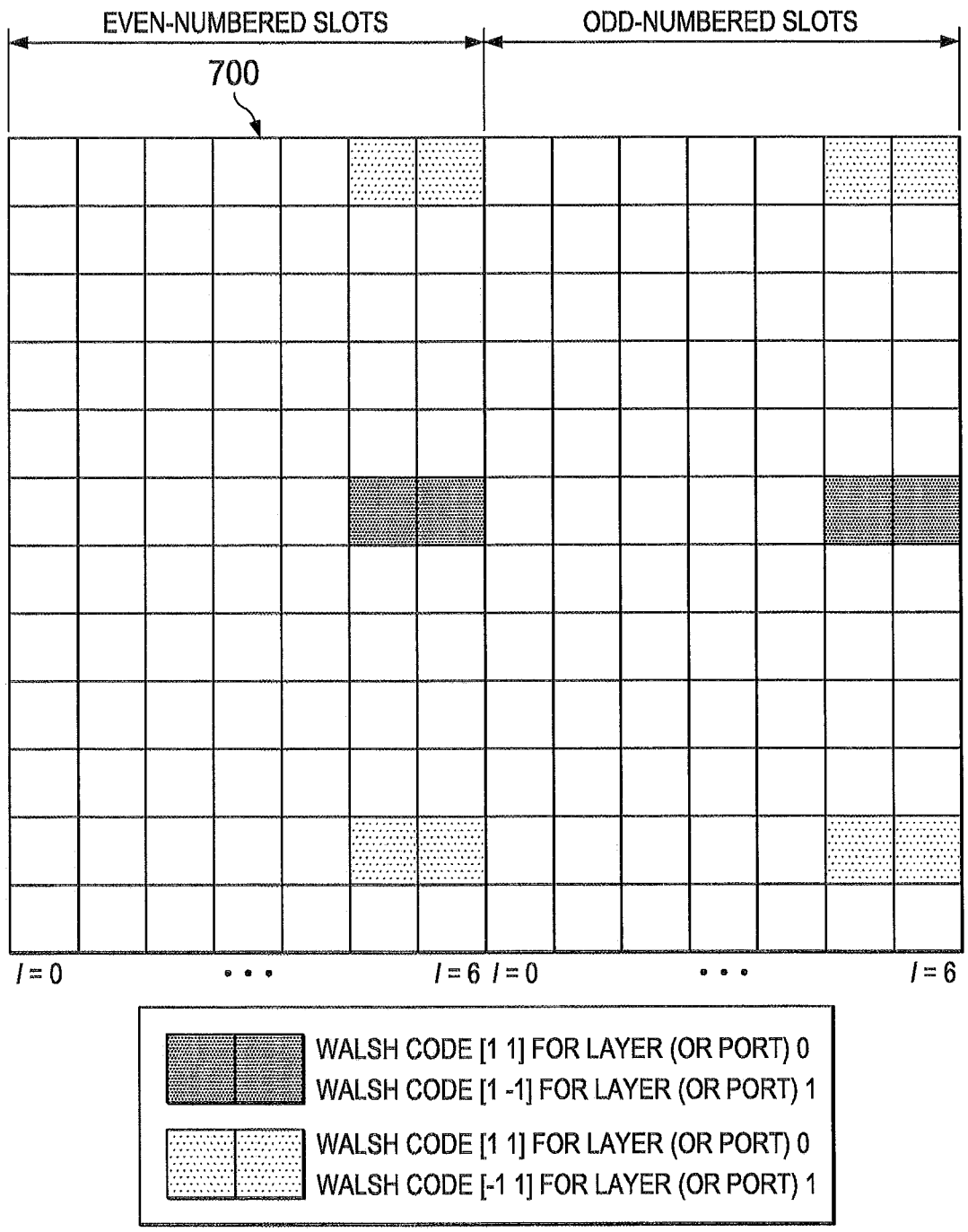
FIG. 7 illustrates a Walsh cover mapping according to an embodiment of this disclosure.

FIG. 7 illustrates a Walsh cover mapping 700 according to an embodiment of this disclosure.

In an embodiment of this disclosure, when a rank-2 DM RS pattern is used within an RB, Walsh cover [1 −1] is used for DM RS 1 and a variation of the Walsh cover [1 −1] is applied. Also, Walsh cover [1 1] is used for DM RS 0, but a variation of the Walsh cover [1 1] is not applied. In this particular embodiment, the variation of Walsh cover [1 −1] is [−1 1]. The resultant Walsh cover mapping in DM RS REs in an RB is shown as the Walsh cover mapping 700, which illustrates Walsh cover variation in the frequency domain.

Figure 8A:
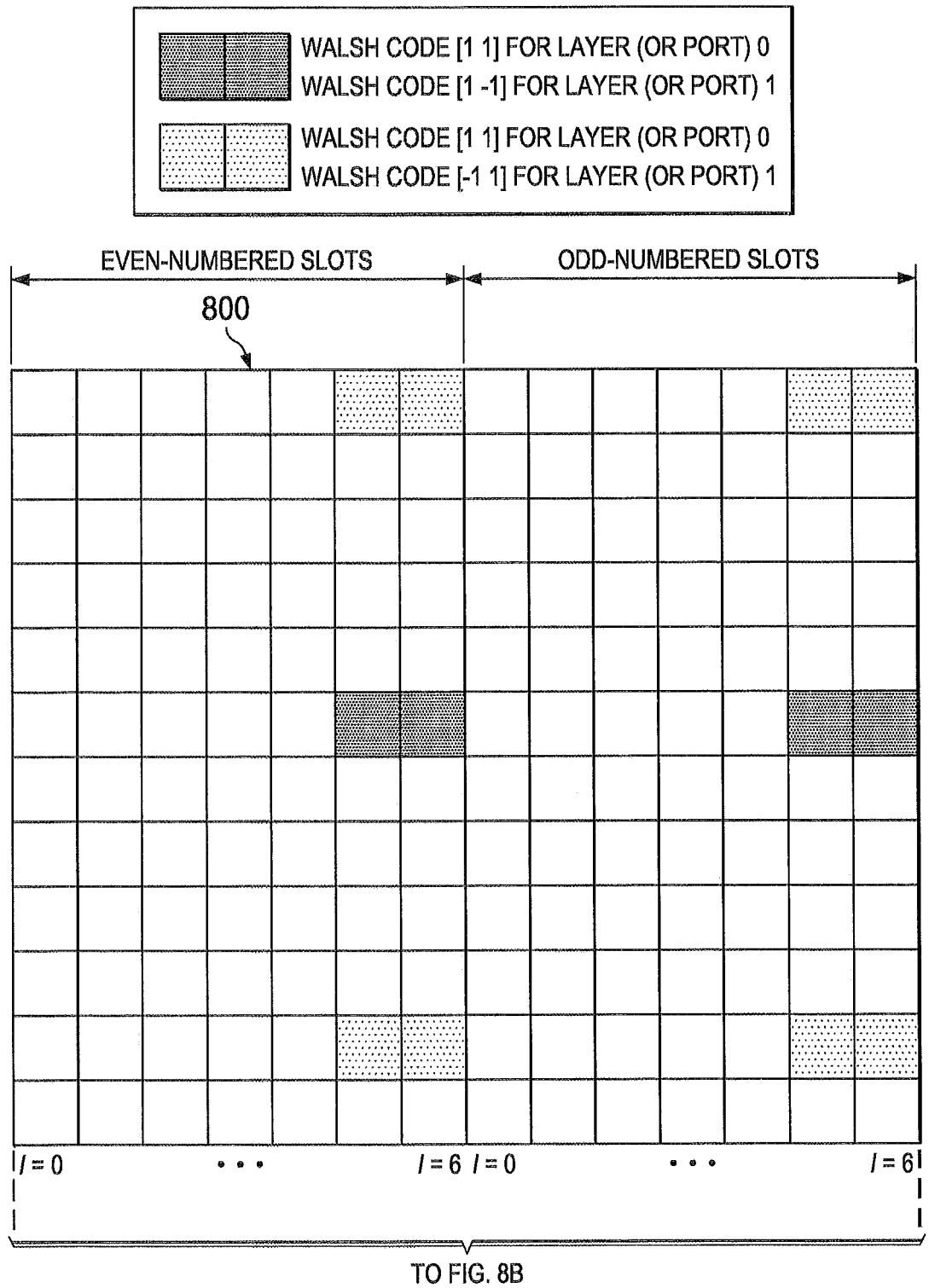
FIGS. 8A through 8C illustrate a Walsh cover mapping according to another embodiment of this disclosure.
Figure 8B:
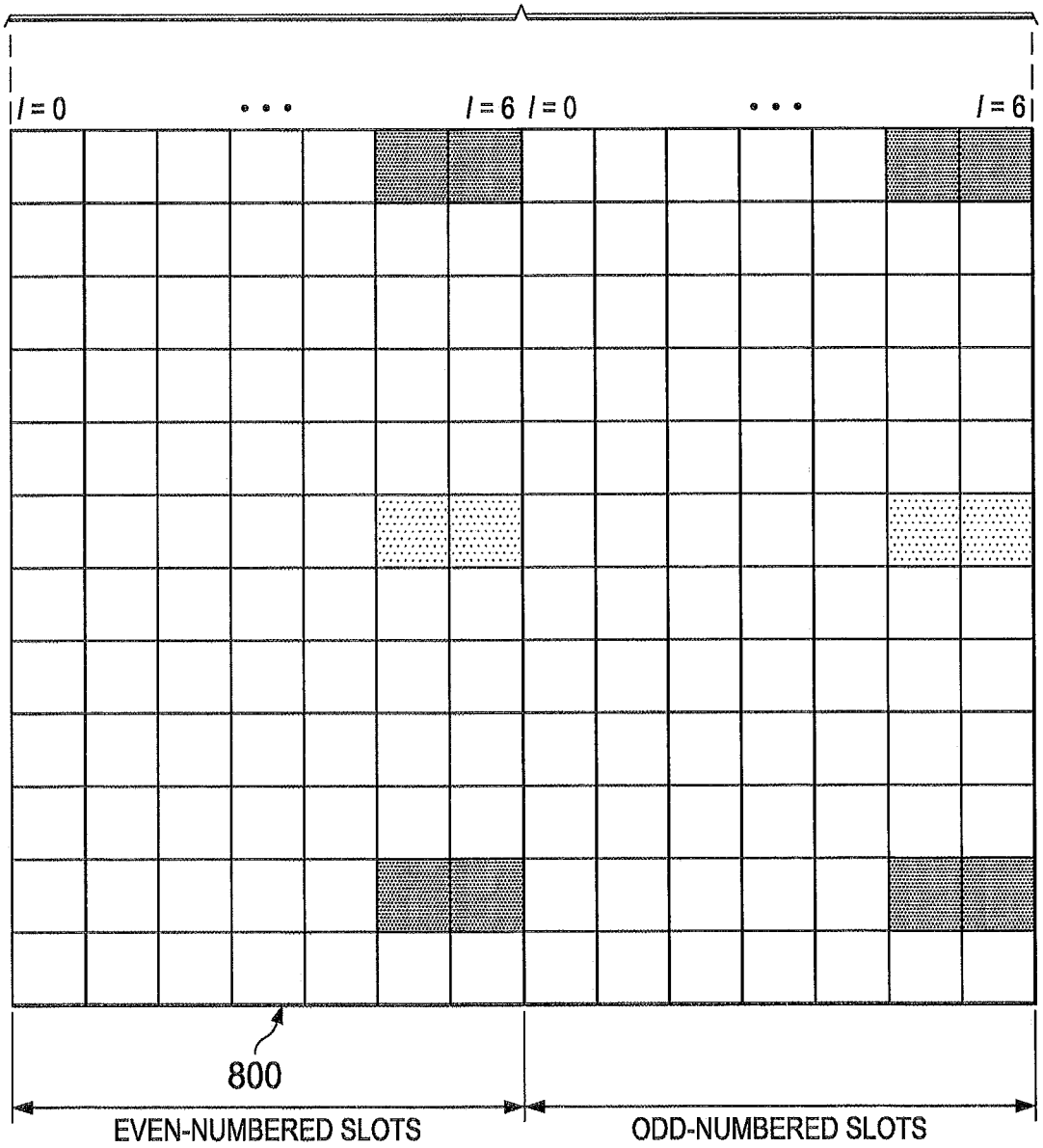
Figure 8C:
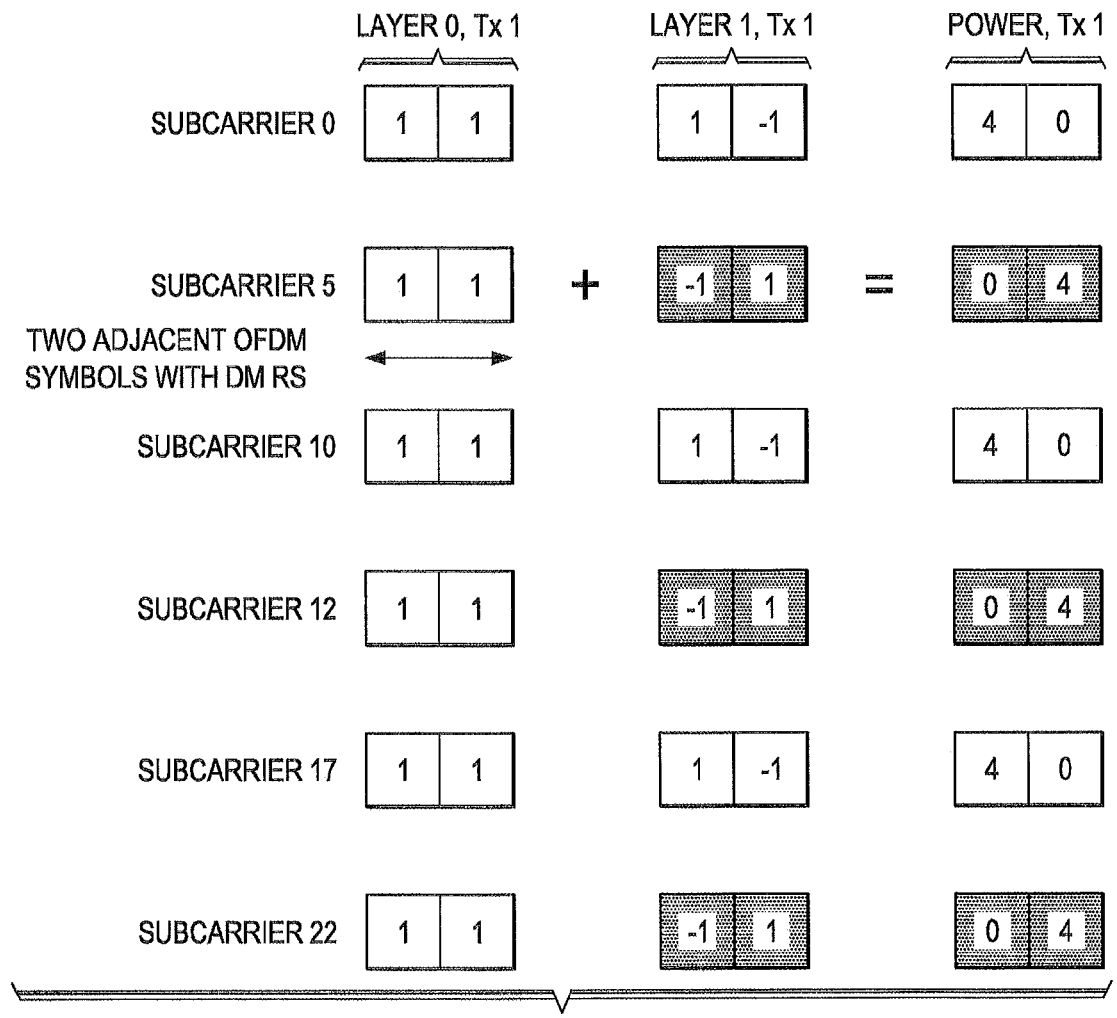

FIGS. 8A through 8C illustrate a Walsh cover mapping 800 according to another embodiment of this disclosure.

In another embodiment of this disclosure, at least two RBs are assigned to a UE, where at least two of the at least two RBs are adjacent or consecutive in the frequency domain. For the at least two adjacent RBs, an eNodeB assigns two layers together with two DM RS in a rank-2 DM RS pattern, where each layer is precoded with a precoding vector. Walsh cover [1 −1] is used for DM RS 1, and a variation of Walsh cover [1 −1] is applied. Walsh cover [1 1] is used for DM RS 0, but a variation of Walsh cover [1 1] is not applied. In this particular embodiment, the variation of Walsh cover [1 −1] is [−1 1]. The resultant Walsh cover mapping in DM RS REs in the adjacent or consecutive RBs is shown as the Walsh cover mapping 800, which illustrates Walsh cover variation in the frequency domain.

In the Walsh cover mapping 800, for layer 1, a Walsh cover and a varied Walsh cover [1 −1] and [−1 1] are alternating across subcarriers with a corresponding DM RS for layer 1. FIG. 8C verifies that the power across two adjacent OFDM symbols with DM RS is balanced for Tx antenna 1.

Although the Walsh covers are described as [1 1] and [1 −1] in the above embodiments, one of ordinary skill in the art would recognize that any number of Walsh covers may be used.

Figure 9:
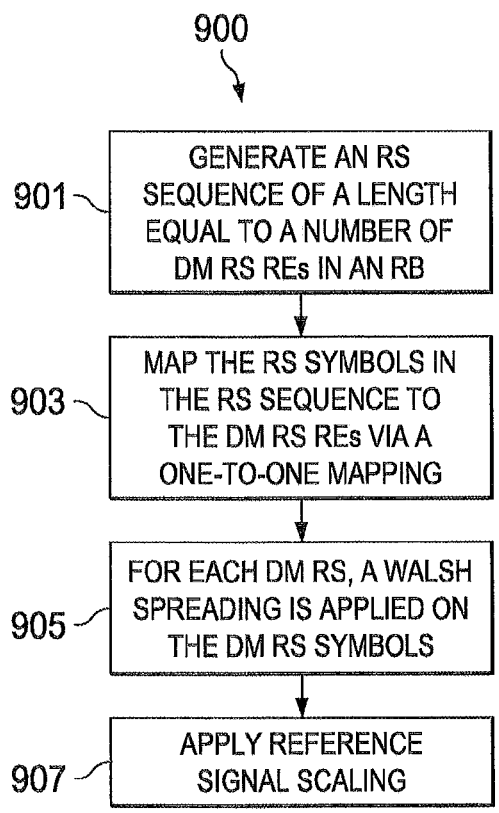
FIG. 9 illustrates a method of providing power balancing across OFDM symbols according to an embodiment of this disclosure.

FIG. 9 illustrates a method 900 of providing power balancing across OFDM symbols according to an embodiment of this disclosure.

Although FIG. 9 shows only up to two CDM DM RS multiplexing, one of ordinary skill in the art would recognize that the RS scaling disclosed in this embodiment can be applied to any arbitrary number of CDM DM RS multiplexing. For example, the RS scaling disclosed in this embodiment can be applied to the 4 CDM DM RS multiplexing of the pattern 420 of FIG. 4B.

In another embodiment of this disclosure, a plurality of DM RS CDM-multiplexed in a set of DM RS REs in a plurality of RBs is assigned with N Walsh covers $w_1$, $w_2$, ..., $w_N$, where N is the number of DM RS. For example, in the rank-8 transmission pattern 420 of FIG. 4B, up to 4 DM RS are CDM-multiplexed in a set of DM RS REs with 4 Walsh covers.

As shown in FIG. 9, an RS sequence of a length equal to a number of DM RS REs in an RB (the length is 12 in this embodiment) is generated at block 901. The 12 RS symbols in the RS sequence are mapped to the 12 DM RS REs via a one-to-one mapping at block 903. 3 DM RS symbols assigned in 3 DM RS REs in an m-th OFDM symbol with DM RS are denoted by $r_{0m}$, $r_{1m}$ and $r_{2m}$, where m=0, 1, 2, 3.

At block 905, for each DM RS n, a Walsh spreading is applied on the 4 DM RS symbols, $r_{i0}$, $r_{i1}$, $r_{i2}$ and $r_{i3}$ on a subcarrier with a Walsh cover $W_n$=[$w_0$, $w_1$, $w_2$, $w_3$], where i=0, 1, 2 and n can be 0, 1, 2 and 3. If a spreading factor 2 is applied for multiplexing two DM RS, then two Walsh covers are applied. For example, $W_0$=[1, 1, 1, 1] is used for DM RS 0, and $W_1$=[1, −1, 1, −1] is used for DM RS 1. If a spreading factor 4 is applied for multiplexing four DM RS such as in the rank-8 transmission pattern 420 in FIG. 4B, then four Walsh covers are applied. For example, $W_0$=[1, 1, 1, 1] is used for DM RS 0, $W_1$=[1, −1, 1, −1] is used for DM RS 1, $W_0$=[1, 1, −1, −1] is used for DM RS 2, and $W_1$=[1, −1, −1, 1] is used for DM RS 3. For example, for DM RS 1 (or for layer 1), the RS symbols mapped to the 12 RS REs after spreading with $W_1$= [1, −1, 1, −1] are [$r_{i0}$, −$r_{i1}$, $r_{i2}$, −$r_{i3}$] in each subcarrier i.

After Walsh spreading, reference signal scaling is applied at block 907, so that the power across the OFDM symbols with DM RS is balanced. For each DM RS n, RS symbols in each subcarrier z are multiplied spread with a scaling factor $f_{in}$. It is noted that scaling factors are both layer-specific and subcarrier-specific.

Figure 10A:
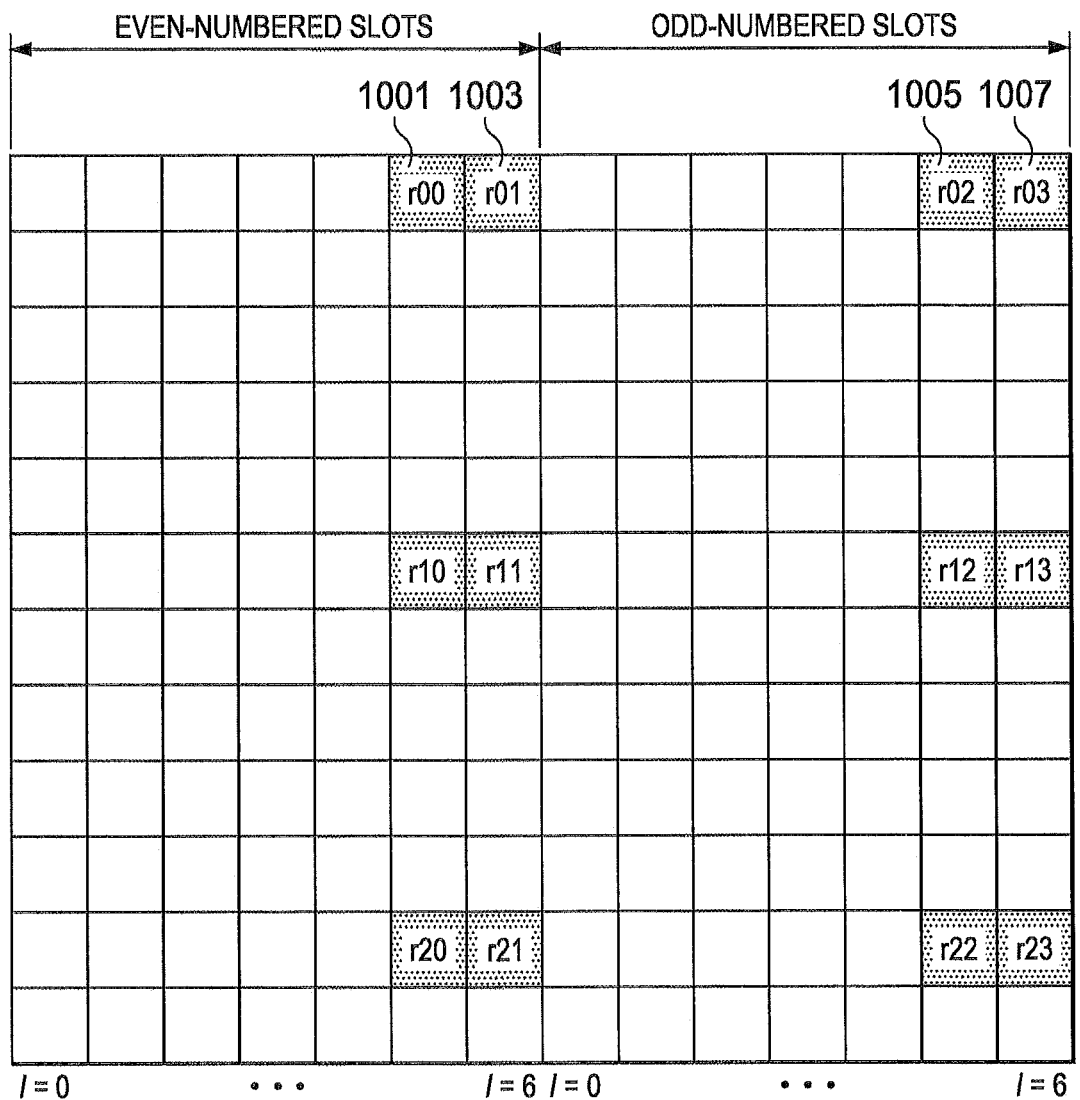
FIGS. 10A through 10B illustrate a balance of powers in four OFDM symbols according to an embodiment of this disclosure.
Figure 10B:
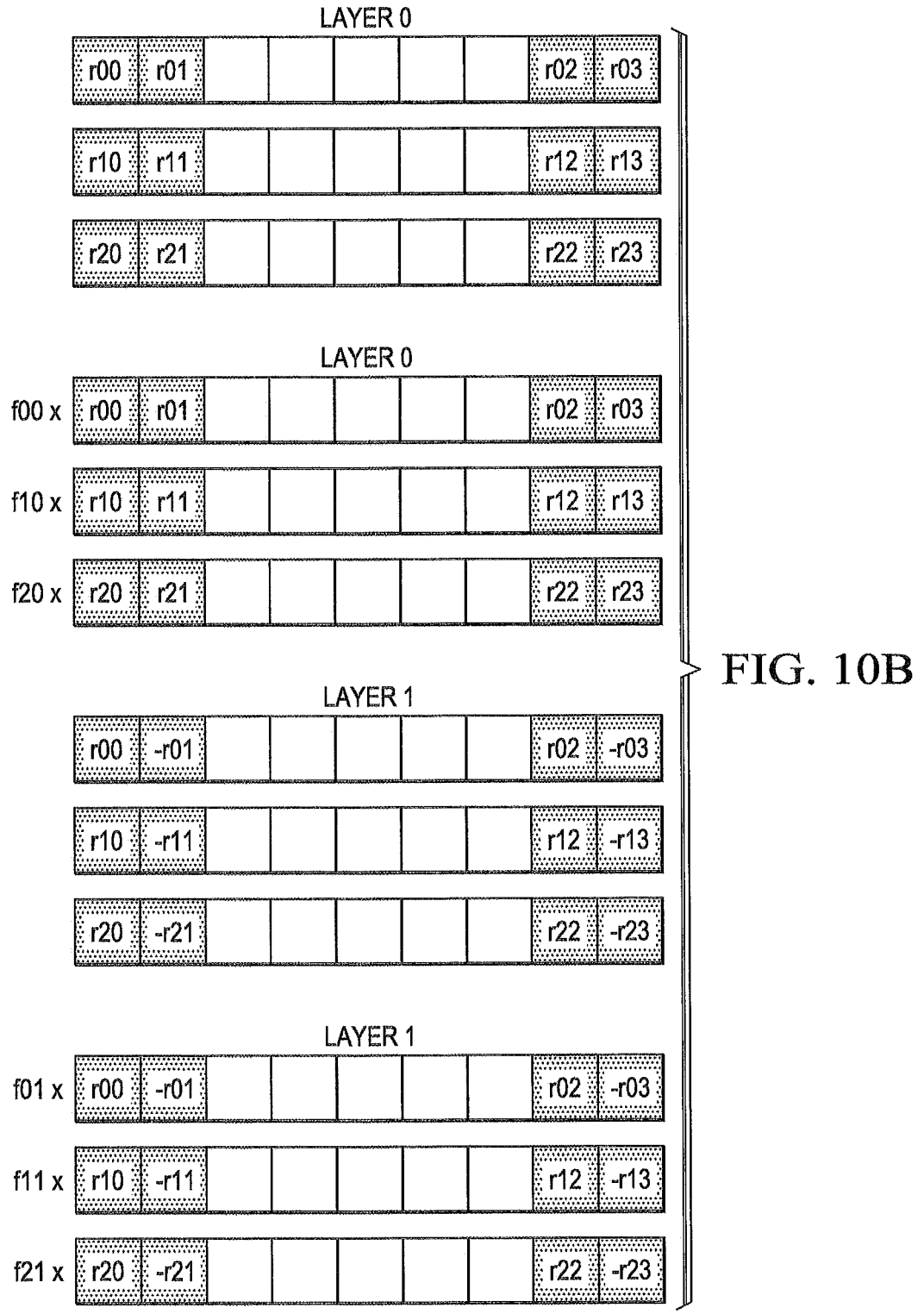

FIGS. 10A and 10B illustrate a balance of powers in four OFDM symbols according to an embodiment of this disclosure.

Scaling factor $f_{in}$ used at the RS scaling block 907 in FIG. 9 is chosen such that powers in the four OFDM symbols 1001, 1003, 1005, and 1007 with RS emitted from each Tx antenna are the same, or at least similar. It is noted that the Walsh spreading block 905 and the scaling block 907 of FIG. 9 either can be combined into a single block or can swap positions, as long as the input-output relationship in FIG. 9 is satisfied.

Some embodiments of choosing $f_{in}$'s for CDM-multiplexed DM RS in DM RS patterns will now be described.

In an embodiment of this disclosure, a resource unit composed of K subcarriers, where both data and RS are precoded with one set of precoders is considered. Furthermore, there are L subcarriers with RS REs among the K subcarriers, and a multiple of RS are CDM-multiplexed in the RS REs on each of the L subcarriers.

When an eNodeB multiplexes N streams in a scheduling unit with N corresponding RS, where N<=L N columns out of the L columns of an L×L discrete Fourier transform (DFT) matrix can be used for the scaling factors, {$f_{in}$}, where i= 1, ..., L and n=1, ... N. An example of such an L×L DFT matrix is shown in Equation 1 below:

$$D_{L \times L} = \begin{bmatrix} 1 & e^{j\frac{2\pi \cdot 0}{L}} & e^{j\frac{2\pi 2 \cdot 0}{L}} & \ldots & e^{j\frac{2\pi(L-1) \cdot 0}{L}} \\ 1 & e^{j\frac{2\pi \cdot 1}{L}} & e^{j\frac{2\pi 2 \cdot 1}{L}} & \ldots & e^{j\frac{2\pi(L-1) \cdot 1}{L}} \\ \vdots & \vdots & \vdots & \ddots & \vdots \\ 1 & e^{j\frac{2\pi \cdot (L-2)}{L}} & e^{j\frac{2\pi 2 \cdot (L-2)}{L}} & \ldots & e^{j\frac{2\pi(L-1)(L-2)}{L}} \\ 1 & e^{j\frac{2\pi \cdot (N-1)}{L}} & e^{j\frac{2\pi 2 \cdot (L-1)}{L}} & \ldots & e^{j\frac{2\pi(L-1)(L-1)}{L}} \end{bmatrix}.$$ [Eqn. 1]

In a particular embodiment, the elements of {$f_{in}$} are listed in a matrix as shown in Equation 2 below:

$$\{f_{in}\} = \begin{bmatrix} f_{11} & \ldots & f_{1N} \\ \vdots & \ddots & \vdots \\ f_{L1} & \ldots & f_{LN} \end{bmatrix}.$$ [Eqn. 2]

In some embodiments, this choice of {$f_{in}$} balances out the power across OFDM symbols with CDM RS REs.

In a particular embodiment, a resource unit is an RB composed of K=12 subcarriers. In addition, L=3 subcarriers have RS REs such as in FIGS. 4 and 10. In such an embodiment, a 3×3 DFT matrix can be defined as shown in Equation 3 below:

$$D_{3 \times 3} = \begin{bmatrix} 1 & 1 & 1 \\ 1 & \omega & \omega^2 \\ 1 & \omega^2 & \omega^4 \end{bmatrix} = \begin{bmatrix} 1 & 1 & 1 \\ 1 & \omega & \omega^* \\ 1 & \omega^* & \omega \end{bmatrix},$$ [Eqn. 3]

where ω is defined as $$\omega = e^{j\frac{2\pi}{3}} = \frac{-1+\sqrt{3}i}{2}$$

and ω* is a complex conjugate of ω. In such an embodiment, it can be verified that ω*+ω+1=0.

FIG. 11 is a table 1100 of scaling factors used for reference signal scaling for rank-2 transmission according to an embodiment of this disclosure.

In an embodiment of this disclosure, two layers (and two DM RS) are multiplexed within an RB. The two DM RS are multiplexed in RS REs on a subcarrier with two Walsh covers, $W_0=[1, 1, 1, 1]$ for DM RS 0, $W_1=[1, -1, 1, -1]$ for DM RS 1. It is noted that this choice of CDM Walsh covers can also be interpreted as a spreading factor 2, as [1 1] and [1 -1] are repeated twice in $W_0$ and $W_1$. In such an embodiment, one set of $f_{in}$'s used at the RS scaling block 907 in FIG. 9 that balances the sum powers across all four OFDM symbols, where the sum is taken place over the three DM RS REs in each OFDM symbol in an RB, for example, shown in FIGS. 10A-10B, is shown in the table 1100. It is noted that for layers 0 and 1 in the table 1100, other combinations and permutations of two columns may be chosen out of the columns, for example, from the DFT matrix $D_{3\times 3}$ of Equation 3. It is also noted that the two Walsh covers $W_0=[1, 1, 1, 1]$ and $W_1=[1, -1, 1, -1]$ are just examples and that one of ordinary skill in the art would recognize that any two orthogonal Walsh covers may be chosen for power balancing with two DM RS.

It is noted that the balancing of the sum powers across the four OFDM symbols in FIGS. 10A-10B can be verified. In a particular embodiment, for a Tx antenna, precoding entries for layers 0 and 1 are A and B, respectively, where A and B are arbitrary complex numbers. Then, the sum power across the 3 subcarriers at the first and the third OFDM symbols, for example, in FIGS. 10A-10B is shown in Equation 4 below:

$$|A+B|^2+|A+\omega B|^2+|A+\omega^* B|^2=3(|A|^2+|B|^2)+2Re(A^*B(1+\omega\omega^*))=3(|A|^2+|B|^2). \quad [\text{Eqn. 4}]$$

Furthermore, the sum power across the 3 subcarriers at the second and the fourth OFDM symbols is shown in Equation 5 below:

$$|A-B|^2+|A-\omega B|^2+|A+\omega^* B|^2=3(|A|^2+|B|^2)-2Re(A^*B(1+\omega\omega^*))=3(|A|^2+|B|^2). \quad [\text{Eqn. 5}]$$

In this particular embodiment, the two numbers are identical to $3(|A|^2+|B|^2)$, which is a triple of a power in a RE with two precoded DM RS symbols. Accordingly, the powers are balanced across the four OFDM symbols within an RB in this embodiment.

FIG. 12 is a table 1200 of scaling factors used for reference signal scaling for rank-3 transmission according to an embodiment of this disclosure.

In another embodiment, three layers (and three DM RS) are multiplexed within an RB. The three DM RS are multiplexed in RS REs on a subcarrier with three Walsh covers, $W_0[1, 1, 1, 1]$ for DM RS 0, $W_1=[1, -1, 1, -1]$ for DM RS 1 and $W_2=[1, 1, -1, -1]$ for DM RS 2. Then, one set of $f_{in}$'s used at the RS scaling block 907 in FIG. 9 that balances the sum powers across all the four OFDM symbols, where the sum is taken place over the three DM RS REs in each OFDM symbol in an RB, for example, shown in FIGS. 10A-10B, is shown in the table 1200.

It is noted that any permutation of the columns can also be used for $f_{in}$'s. It is also noted that the three Walsh covers $W_0=[1, 1, 1, 1]$, $W_1=[1, -1, 1, -1]$ and $W_2=[1, 1, -1, -1]$ are just examples and that one of ordinary skill in the art would recognize that any three orthogonal Walsh covers may be chosen for power balancing with three DM RS.

It is noted that the balancing of the sum powers across the four OFDM symbols in FIGS. 10A-10B can be verified. In another embodiment, four layers (and four DM RS) are multiplexed within an RB. The four DM RS are multiplexed in RS REs on a subcarrier with four Walsh covers. Then, one set of $f_{in}$'s that mitigates the power imbalance across the four OFDM symbols, where the sum is taken place over the three DM RS REs in each OFDM symbol in an RB, for example, shown in FIGS. 10A-10B, is constructed by adding one more column for Layer 3 to $\{f_{in}\}$ with three columns, e.g., the table 1200. One set of examples of an additional column for layer 3 is constructed with a unit-amplitude complex number entries:

$$\begin{bmatrix} 1 \\ -1 \\ 1 \end{bmatrix}, \begin{bmatrix} -1 \\ 1 \\ -1 \end{bmatrix}, \text{ and } \begin{bmatrix} 1 \\ -1 \\ -1 \end{bmatrix}.$$

Another set of examples of an additional column for layer 3 is constructed with one column from the DFT matrix, for example, shown in Equation 3:

$$\begin{bmatrix} 1 \\ 1 \\ 1 \end{bmatrix}, \begin{bmatrix} 1 \\ \omega \\ \omega^* \end{bmatrix}, \text{ and } \begin{bmatrix} 1 \\ \omega^* \\ \omega \end{bmatrix}.$$

In other embodiments of this disclosure, in a resource unit, there are at least L=6 subcarriers having RS REs. In this case, a 6×6 DFT matrix shown in Equation 6 below is considered:

$$D_{6\times 6} = \begin{bmatrix} 1 & 1 & 1 & 1 & 1 & 1 \\ 1 & \omega^{1/2} & \omega & \omega^{3/2} & \omega^2 & \omega^{5/2} \\ 1 & \omega & \omega^2 & \omega^3 & \omega^4 & \omega^5 \\ 1 & \omega^{3/2} & \omega^3 & \omega^{9/2} & \omega^6 & \omega^{15/2} \\ 1 & \omega^2 & \omega^4 & \omega^6 & \omega^8 & \omega^{10} \\ 1 & \omega^{5/2} & \omega^5 & \omega^{15/2} & \omega^{10} & \omega^{25/2} \end{bmatrix} = \quad [\text{Eqn. 6}]$$

$$\begin{bmatrix} 1 & 1 & 1 & 1 & 1 & 1 \\ 1 & \omega^{1/2} & \omega & -1 & \omega^* & -\omega \\ 1 & \omega & \omega^* & 1 & \omega & \omega^* \\ 1 & -1 & 1 & -1 & 1 & -1 \\ 1 & \omega^* & \omega & 1 & \omega^* & \omega \\ 1 & -\omega & \omega^* & -1 & \omega & \omega^{1/2} \end{bmatrix},$$

where ω is defined as $$\omega = e^{j\frac{2\pi}{3}} = \frac{-1+\sqrt{3}\,i}{2}$$

and ω* is a complex conjugate of ω. Then, $$\omega^{1/2} = e^{j\frac{\pi}{3}} = \frac{1+\sqrt{3}\,i}{2}.$$

In this case, it can be verified that ω*+ω+1=0, ω³=1 and ω^(3/2)=−1. In one example, a resource unit is at least as large as two consecutive RBs composed of K=24 subcarriers. In addition, 3 subcarriers have RS REs per RB (or per 12 subcarriers) such as FIGS. 4 and 10.

FIG. 13 is a table 1300 of scaling factors used for reference signal scaling for rank-2, 3 and 4 transmissions according to an embodiment of this disclosure.

FIG. 14 is a table 1400 of scaling factors used for reference signal scaling for rank-2, 3 and 4 transmissions according to another embodiment of this disclosure.

In one embodiment, up to four layers (and up to four DM RS) are multiplexed within two consecutive RBs from a bundle of at least two RBs. The DM RS are multiplexed in RS REs on a subcarrier with Walsh covers. Then, one set of $f_{in}$'s used at the RS scaling block 907 in FIG. 9 that balances the sum powers across all the four OFDM symbols, where the sum is taken place over the six DM RS REs in each OFDM symbol in the two RBs where an RB, for example, shown in FIGS. 10A-10B, is shown in the table 1300 and the table 1400. It is noted that for the scaling factors for the layers, i.e., $\{f_{in}\}$, other combinations and permutations of four columns may be chosen out of the columns, for example, from the DFT matrix $D_{5\times 6}$ of Equation 6. It is also noted that the scaling factors defined in the table 1400 balance the power per RB up to rank-3 transmission, while the scaling factors require an allocation size of a multiple of two RBs for power balancing for rank-4 transmission.

It is noted that the table 1300 and the table 1400 can also be used for scaling 6 subcarriers with DM RS within one RB.

FIG. 15 is a table 1500 illustrating a construction of a resource block according to an embodiment of this disclosure.

In some embodiments of this disclosure, a resource unit composed of 12 subcarriers, where both data and RS are precoded with one set of precoders, is considered. There are 3 subcarriers with RS REs among the 12 subcarriers, and a multiple of RS are multiplexed with CDM in the RS REs on each of the 12 subcarrier. In these embodiments, $\{f_{in}\}$, i.e., $$\{f_{in}\} = \begin{bmatrix} f_{11} & \cdots & f_{14} \\ \vdots & \ddots & \vdots \\ f_{31} & \cdots & f_{34} \end{bmatrix},$$

is chosen at the RS scaling block 907 in FIG. 9 such that:
the first column is $$\begin{bmatrix} 1 \\ 1 \\ 1 \end{bmatrix},$$

and
the second, the third and the fourth columns are different from each other. Each column has two entries with CU and one entry with 1. Alternatively, each column has two entries with ω* and one entry with 1.

It is noted that this solution mitigates the power imbalance problem.

Figure 16A:
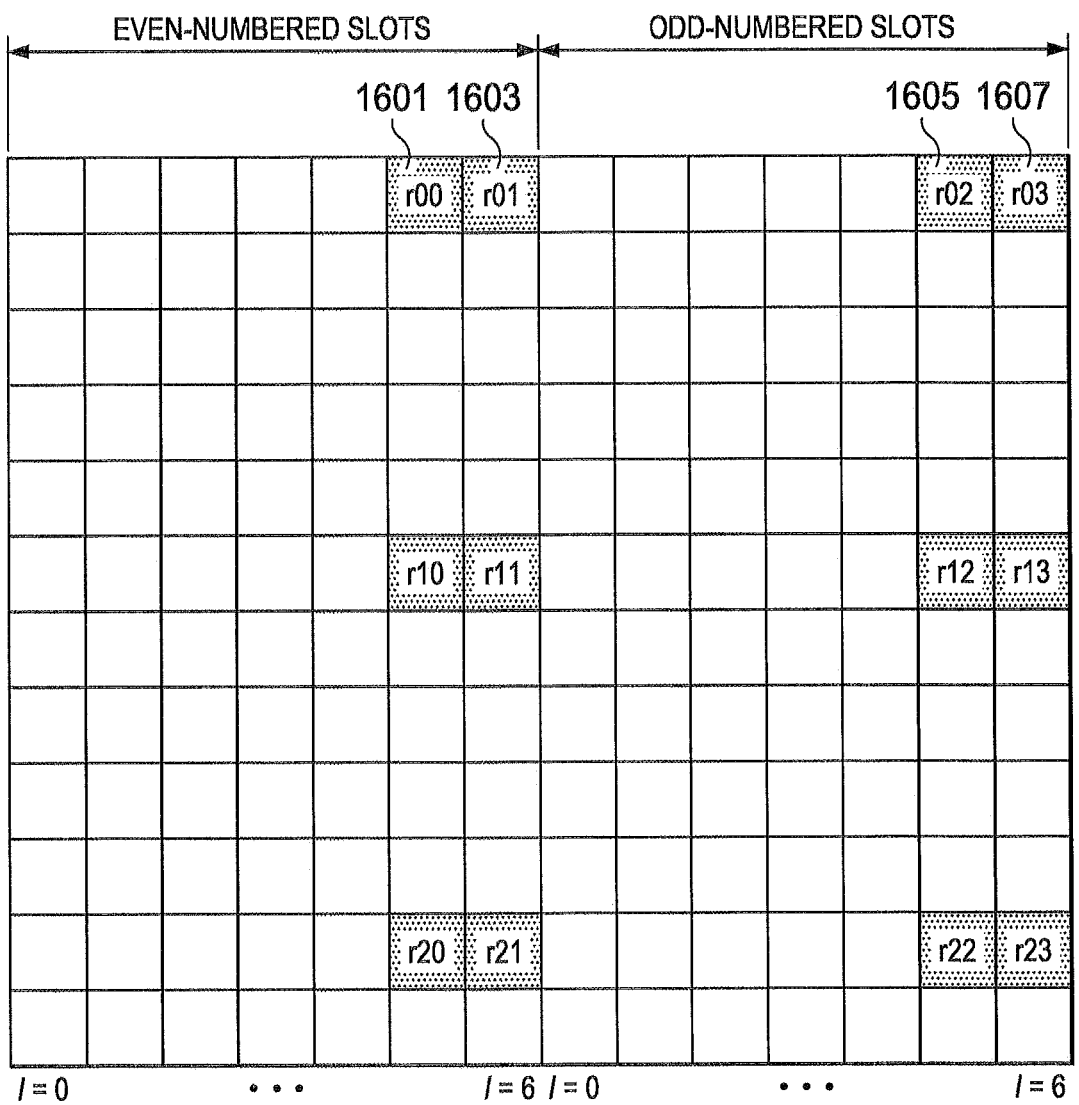
FIGS. 16A through 16B illustrate a balance of powers in four OFDM symbols according to another embodiment of this disclosure.
Figure 16B:
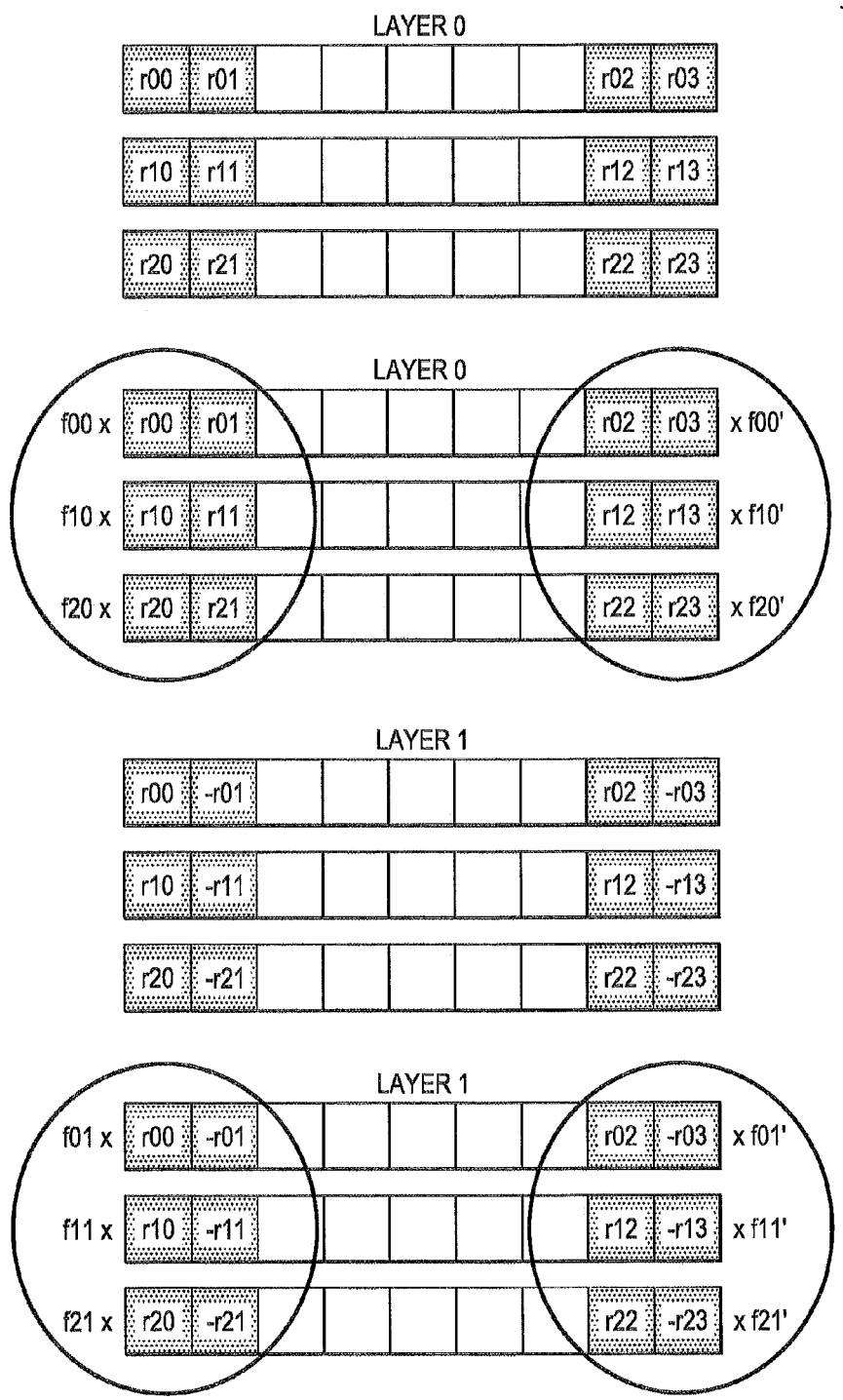

FIGS. 16A and 16B illustrate a balance of powers in four OFDM symbols according to another embodiment of this disclosure.

In the embodiment of FIGS. 10A-10B, each subcarrier with DM RS is multiplied with two scaling factors at the RS scaling block 907 in FIG. 9. The scaling factors are chosen such that powers in the four OFDM symbols 1601, 1603, 1605, and 1607 with RS emitted from each Tx antenna are the same, or at least similar. One scaling factor is multiplied on the first two REs in the time domain, and the other is multiplied on the last two RES in the time domain, For example, as shown in FIGS. 16A-16B, $f_{00}$ is multiplied to $[r_{00}\ r_{01}]$, and $f'_{00}$ is multiplied to $[r_{02}\ r_{03}]$.

FIG. 17 is a table 1700 of scaling factors used for reference signal scaling for rank-2 transmission according to another embodiment of this disclosure.

In a particular embodiment, two streams are multiplexed within a physical resource block (PRB). In this embodiment, $f_{in}$ defined in the table 1100 and $f'_{in}$ defined in the table 1700 are used to implement the RS scaling block 907 in FIG. 9. This embodiment increases channel estimation performance at the UE side.

Figure 18:
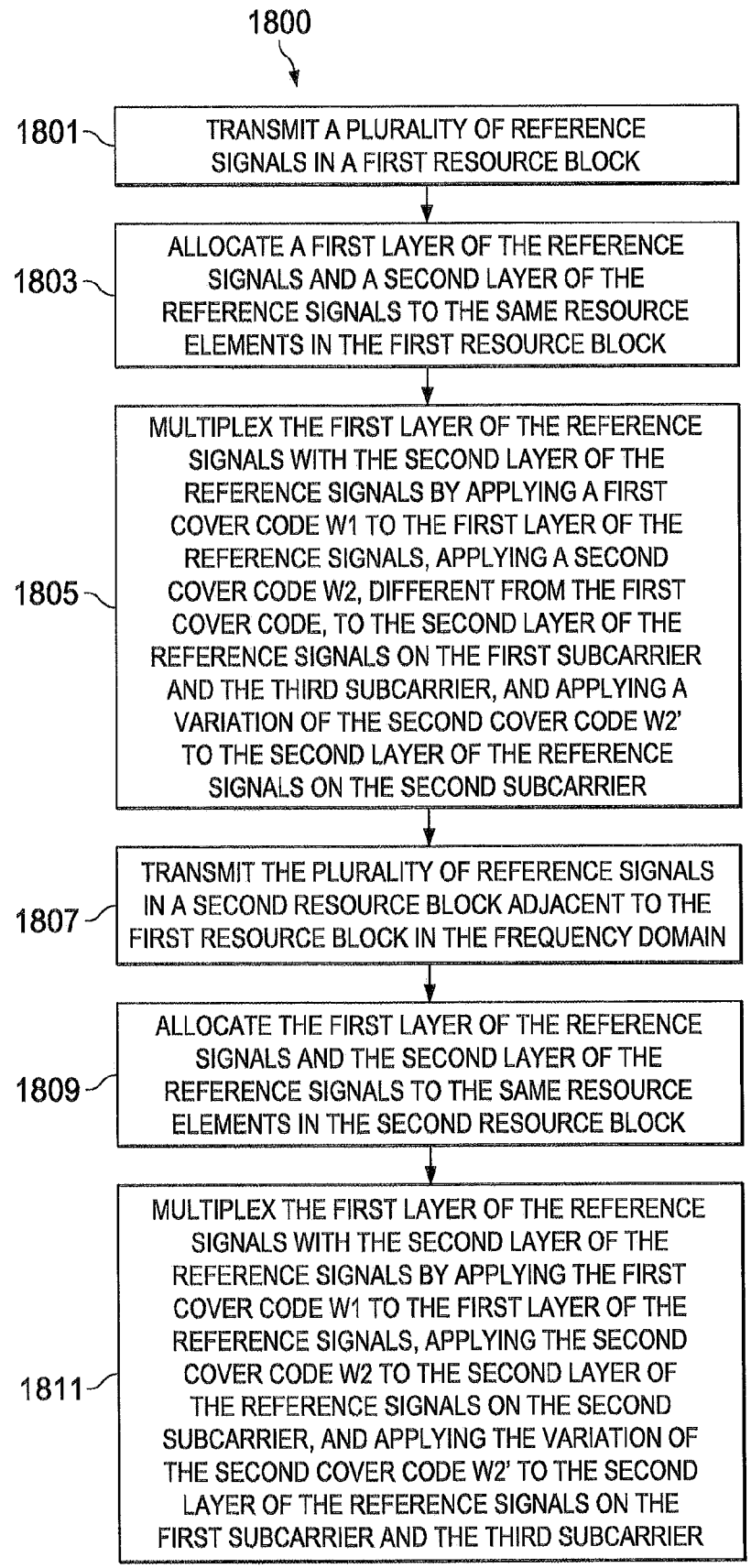
FIG. 18 illustrates a method of operating a base station according to an embodiment of this disclosure.

FIG. 18 illustrates a method 1800 of operating a base station according to an embodiment of this disclosure.

As shown in FIG. 18, the method 1800 includes transmitting a plurality of reference signals in a first resource block (block 1801). The method 1800 also includes allocating a first layer of the reference signals and a second layer of the reference signals to the same resource elements in the first resource block (block 1803). The reference signals are (i) allocated to a first group of two adjacent resource elements corresponding to a first OFDM symbol and a second OFDM symbol on a first subcarrier of the first resource block, (ii) allocated to a second group of two adjacent resource elements corresponding to the first OFDM symbol and the second OFDM symbol on a second subcarrier of the first resource block, and (iii) allocated to a third group of two adjacent resource elements corresponding to the first OFDM symbol and the second OFDM symbol on a third subcarrier of the first resource block. The method further includes multiplexing the first layer of the reference signals with the second layer of the reference signals by applying a first cover code W1 to the first layer of the reference signals, applying a second cover code W2, different from the first cover code, to the second layer of the reference signals on the first subcarrier and the third subcarrier, and applying a variation of the second cover code W2' to the second layer of the reference signals on the second subcarrier (block 1805).

The method 1800 also includes transmitting the plurality of reference signals in a second resource block adjacent to the first resource block in the frequency domain (block 1807). The method 1800 further includes allocating the first layer of the reference signals and the second layer of the reference signals to the same resource elements in the second resource block (block 1809). The reference signals are (i) allocated to a first group of two adjacent resource elements corresponding to the first OFDM symbol and the second OFDM symbol on a first subcarrier of the second resource block, (ii) allocated to a second group of two adjacent resource elements corresponding to the first OFDM symbol and the second OFDM symbol on a second subcarrier of the second resource block, and (iii) allocated to a third group of two adjacent resource elements corresponding to the first OFDM symbol and the second OFDM symbol on a third subcarrier of the second resource block. The method 1800 still further includes multiplexing the first layer of the reference signals with the second layer of the reference signals by applying the first cover code W1 to the first layer of the reference signals, applying the second cover code W2 to the second layer of the reference signals on the second subcarrier, and applying the variation of the second cover code W2' to the second layer of the reference signals on the first subcarrier and the third subcarrier (block 1811).

FIG. 19 illustrates a method 1900 of operating a subscriber station according to an embodiment of this disclosure.

As shown in FIG. 19, the method 1900 includes receiving a plurality of reference signals in a first resource block (block 1901). A first layer of the reference signals and a second layer of the reference signals are allocated to the same resource elements in the first resource block, wherein the reference signals are (i) allocated to a first group of two adjacent resource elements corresponding to a first OFDM symbol and a second OFDM symbol on a first subcarrier of the first resource block, (ii) allocated to a second group of two adjacent resource elements corresponding to the first OFDM symbol and the second OFDM symbol on a second subcarrier of the first resource block, and (iii) allocated to a third group of two adjacent resource elements corresponding to the first OFDM symbol and the second OFDM symbol on a third subcarrier of the first resource block. The first layer of the reference signals is multiplexed with the second layer of the reference signals. A first cover code W1 is applied to the first layer of the reference signals, a second cover code W2, different from the first cover code, is applied to the second layer of the reference signals on the first subcarrier and the third subcarrier, and a variation of the second cover code W2' is applied to the second layer of the reference signals on the second subcarrier.

The method 1900 also includes receiving a plurality of reference signals in a second resource block adjacent to the first resource block in the frequency domain (block 1903). The first layer of the reference signals and the second layer of the reference signals are allocated to the same resource elements in the second resource block. The reference signals are (i) allocated to a first group of two adjacent resource elements corresponding to the first OFDM symbol and the second OFDM symbol on a first subcarrier of the second resource block, (ii) allocated to a second group of two adjacent resource elements corresponding to the first OFDM symbol and the second OFDM symbol on a second subcarrier of the second resource block, and (iii) allocated to a third group of two adjacent resource elements corresponding to the first OFDM symbol and the second OFDM symbol on a third subcarrier of the second resource block. The first layer of the reference signals is multiplexed with the second layer of the reference signals. The first cover code W1 is applied to the first layer of the reference signals, the second cover code W2 is applied to the second layer of the reference signals on the second subcarrier, and the variation of the second cover code W2' is applied to the second layer of the reference signals on the first subcarrier and the third subcarrier.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
a downlink transmit path comprising circuitry configured to control transmission to a user equipment (UE) of UE-specific reference signal (RS) patterns on at least first and second antenna ports,
wherein a first cover code W1 is applied to UE-specific reference signals transmitted on the first antenna port,
wherein a second cover code W2, different from the first cover code, is applied to odd-numbered recurrences of the UE-specific reference signal within the reference signal pattern transmitted on the second antenna port, and
wherein a variation W2' of the second cover code is applied to even-numbered recurrences of the UE-specific reference signal within the reference signal pattern transmitted on the second antenna port.

2. The base station in accordance with claim 1, wherein each recurrence of the UE-specific reference signal within the reference signal pattern transmitted on the first and second antenna ports occupies two adjacent resource elements (REs).

3. The base station in accordance with claim 1, wherein the UE-specific reference signal recurs every fifth subcarrier within the reference signal pattern transmitted on the first and second antenna ports.

4. The base station in accordance with claim 1, wherein the variation W2' of the second cover code is constructed by at least one of: flipping a sign of elements of the second cover code W2, cyclically shifting elements of the second cover code W2 to the left, and cyclically shifting elements of the second cover code W2 to the right.

5. The base station in accordance with claim 1, wherein W1=[1 1], W2=[1 −1] and W2'=[−1 1].

6. The base station in accordance with claim 1, wherein W1=[1 1], W2=[−1 1] and W2'=[1 −1].

7. A method of operating a base station, the method comprising:
for transmission to a user equipment (UE) of UE-specific reference signal (RS) patterns on at least first and second antenna ports,
applying a first cover code W1 to UE-specific reference signals transmitted on the first antenna port,
applying a second cover code W2, different from the first cover code, to odd-numbered recurrences of the UE-specific reference signal within the reference signal pattern transmitted on the second antenna port, and
applying a variation W2' of the second cover code to even-numbered recurrences of the UE-specific reference signal within the reference signal pattern transmitted on the second antenna port.

8. The method in accordance with claim 7, wherein each recurrence of the UE-specific reference signal within the reference signal pattern transmitted on the first and second antenna ports occupies two adjacent resource elements (REs).

9. The method in accordance with claim 7, wherein the UE-specific reference signal recurs every fifth subcarrier within the reference signal pattern transmitted on the first and second antenna ports.

10. The method in accordance with claim 7, wherein the variation W2' of the second cover code is constructed by at least one of: flipping a sign of elements of the second cover code W2, cyclically shifting elements of the second cover code W2 to the left, and cyclically shifting elements of the second cover code W2 to the right.

11. The method in accordance with claim 7, wherein W1=[1 1], W2=[1 −1] and W2'=[−1 1].

12. The method in accordance with claim 7, wherein W1=[1 1], W2=[−1 1] and W2'=[1 −1].

13. A user equipment (UE), comprising:
a downlink receive path comprising circuitry configured to receive UE-specific reference signal patterns on at least first and second transmission layers,
wherein a first cover code W1 is applied to UE-specific reference signals transmitted on the first transmission layer, wherein a second cover code W2, different from the first cover code, is applied to odd-numbered recurrences of the UE-specific reference signal within the reference signal pattern transmitted on the second transmission layer, and wherein a variation W2' of the second cover code is applied to even-numbered recurrences of the UE-specific reference signal within the reference signal pattern transmitted on the second transmission layer.

14. The subscriber station in accordance with claim 13, wherein each recurrence of the UE-specific reference signal within the reference signal pattern transmitted on the first and second antenna ports occupies two adjacent resource elements (REs).

15. The subscriber station in accordance with claim 13, wherein the UE-specific reference signal recurs every fifth subcarrier within the reference signal pattern transmitted on the first and second antenna ports.

16. The subscriber station in accordance with claim 13, wherein the variation W2' of the second cover code is constructed by at least one of: flipping a sign of elements of the second cover code W2, cyclically shifting elements of the second cover code W2 to the left, and cyclically shifting elements of the second cover code W2 to the right.

17. The subscriber station in accordance with claim 13, wherein W1=[1 1], W2=[1 −1] and W2'=[−1 1].

18. The subscriber station in accordance with claim 13, wherein W1=[1 1], W2=[−1 1] and W2'=[1 −1].

19. A method of operating a user equipment (UE), the method comprising:

receiving UE-specific reference signal patterns on at least first and second transmission layers, wherein a first cover code W1 is applied to UE-specific reference signals transmitted on the first transmission layer, wherein a second cover code W2, different from the first cover code, is applied to odd-numbered recurrences of the UE-specific reference signal within the reference signal pattern transmitted on the second transmission layer, and wherein a variation W2' of the second cover code is applied to even-numbered recurrences of the UE-specific reference signal within the reference signal pattern transmitted on the second transmission layer.

20. The method in accordance with claim 19, wherein each recurrence of the UE-specific reference signal within the reference signal pattern transmitted on the first and second antenna ports occupies two adjacent resource elements (REs).

21. The method in accordance with claim 19, wherein the UE-specific reference signal recurs at every fifth subcarrier within the reference signal pattern transmitted on the first and second antenna ports.

22. The method in accordance with claim 19, wherein the variation W2' of the second cover code is constructed by at least one of: flipping a sign of elements of the second cover code W2, cyclically shifting elements of the second cover code W2 to the left, and cyclically shifting elements of the second cover code W2 to the right.

23. The method in accordance with claim 19, wherein W1=[1 1], W2=[1 −1] and W2'=[−1 1].

24. The method in accordance with claim 19, wherein W1=[1 1], W2=[−1 1] and W2'=[1 −1].

* * * * *